(12) United States Patent
Lee

(10) Patent No.: US 7,059,457 B2
(45) Date of Patent: Jun. 13, 2006

(54) EXPANSION MOTOR

(76) Inventor: Lanny R. Lee, 5090 N. Harbor City Blvd., Melbourne, FL (US) 32940

( * ) Notice: Subject to any disclaimer, the term of this patent is extended or adjusted under 35 U.S.C. 154(b) by 18 days.

(21) Appl. No.: 10/668,742

(22) Filed: Oct. 6, 2003

(65) Prior Publication Data

US 2005/0072636 A1    Apr. 7, 2005

(51) Int. Cl.
  *B60T 11/00*    (2006.01)
  *F16D 51/00*    (2006.01)
  *B23B 31/40*    (2006.01)
  *B23B 5/22*    (2006.01)

(52) U.S. Cl. ............... 188/365; 188/78; 188/75; 188/151 R; 279/2.07; 279/4.11

(58) Field of Classification Search ............... 188/78, 188/365, 366, 367, 368, 75, 151 R, 369; 279/2.01, 2.06, 2.07, 2.08, 4.03, 4.04, 4.11; 403/5, 31
See application file for complete search history.

(56) References Cited

U.S. PATENT DOCUMENTS

| | | | | |
|---|---|---|---|---|
| 2,797,603 | A | * | 7/1957 | Atherholt et al. .......... 279/2.08 |
| 4,026,491 | A | * | 5/1977 | Bostroem ................ 242/530.3 |
| 4,366,735 | A |   | 1/1983 | Dubois, Sr. |
| 4,391,451 | A | * | 7/1983 | Secor et al. ............... 279/2.09 |
| 4,677,792 | A |   | 7/1987 | Speidel |
| 4,697,966 | A |   | 10/1987 | Baur |
| 4,840,323 | A | * | 6/1989 | Nakajima ................. 279/2.08 |
| 5,096,326 | A |   | 3/1992 | Eiting |
| 5,127,780 | A |   | 7/1992 | Massa |
| 5,286,042 | A | * | 2/1994 | Laube ....................... 279/4.03 |
| 5,516,243 | A |   | 5/1996 | Laube |
| 5,769,487 | A |   | 6/1998 | Michler |
| 5,803,399 | A | * | 9/1998 | Hashikawa ............... 279/2.07 |
| 5,845,384 | A |   | 12/1998 | Retzbach |
| 5,979,267 | A |   | 11/1999 | Yonezawa |
| 6,000,687 | A | * | 12/1999 | Andre ......................... 269/22 |
| 6,077,003 | A |   | 6/2000 | Laube |
| 6,224,067 | B1 |   | 5/2001 | Lindstrom |
| 6,311,987 | B1 |   | 11/2001 | Rinne et al. |
| 6,375,172 | B1 |   | 4/2002 | Bungart et al. |
| 6,488,285 | B1 |   | 12/2002 | Allard |
| 6,604,451 | B1 |   | 8/2003 | Yasuda |

FOREIGN PATENT DOCUMENTS

DE    2719655 A   *   11/1978

* cited by examiner

*Primary Examiner*—Thomas Williams

(57) ABSTRACT

The present invention is a unique motor comprising a containment chamber having thick walls surrounding a thin wall, is created when a plug is fusible joined. An inlet port and preferably a purging port are located in the thick walls. A motion is created when said expansion wall expands as said containment chamber is pressurized.

21 Claims, 5 Drawing Sheets

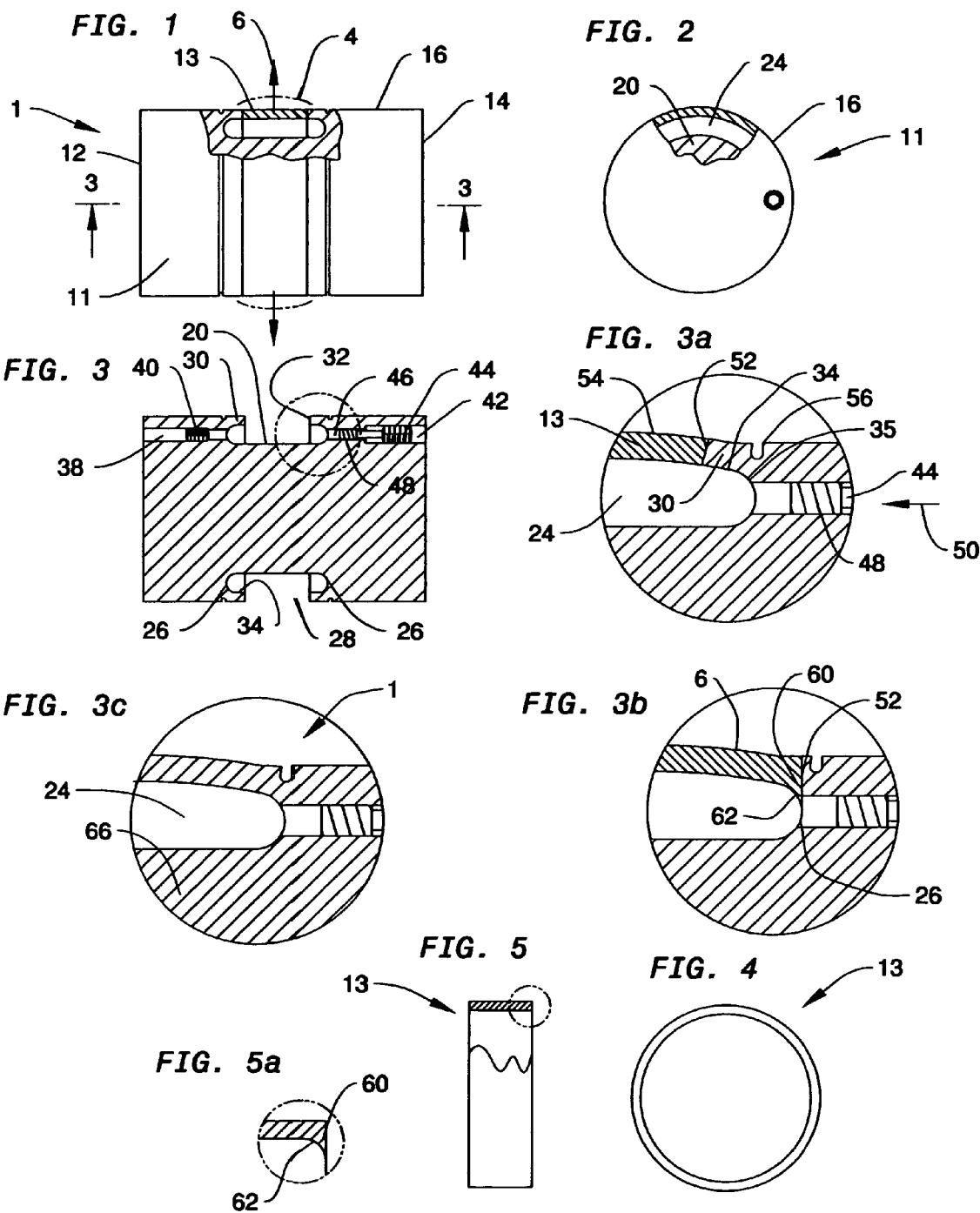

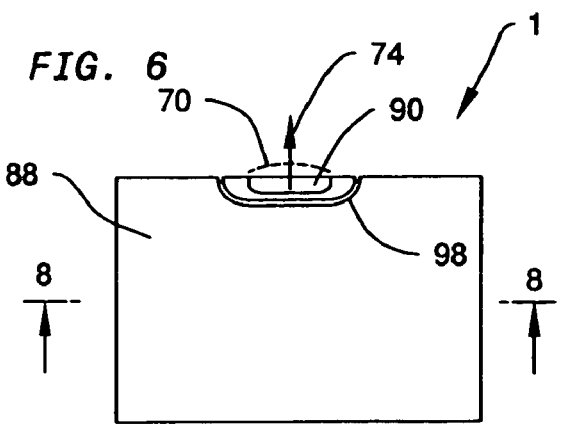
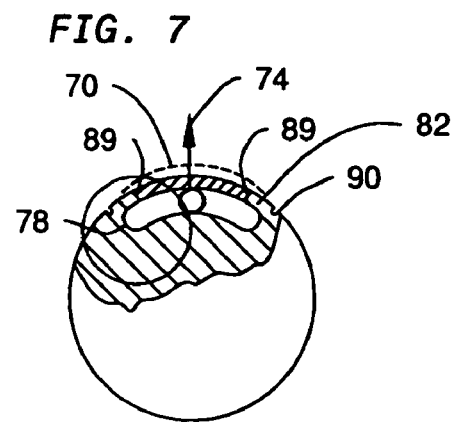
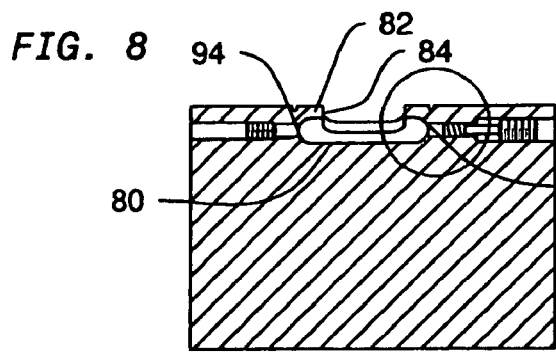
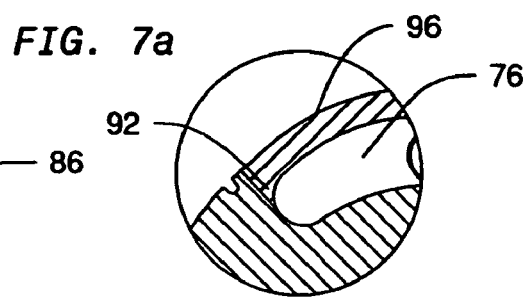
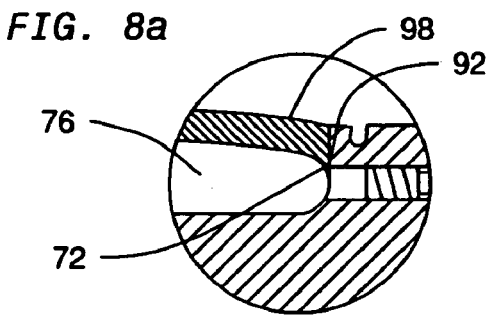
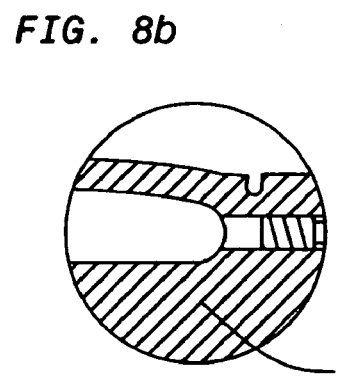
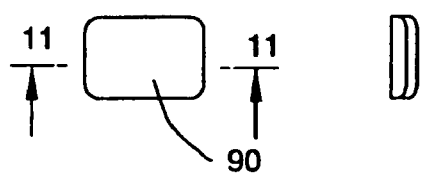

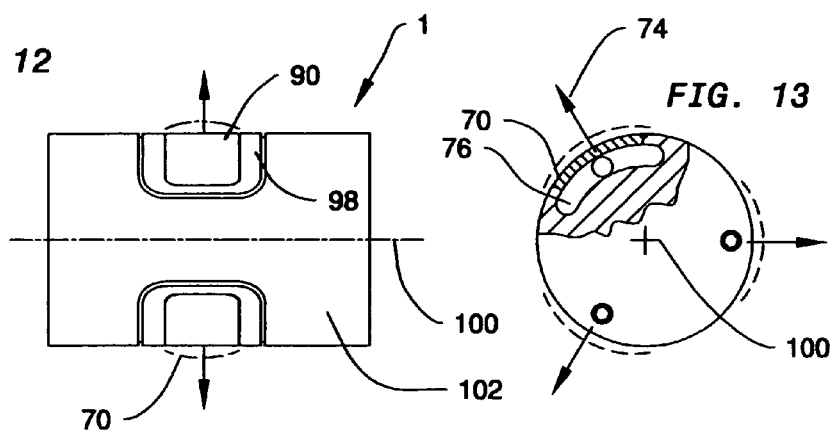
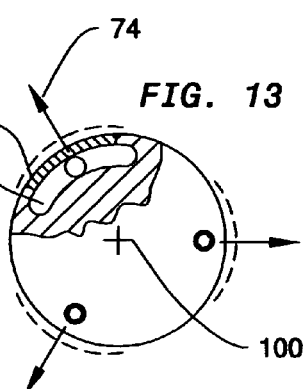
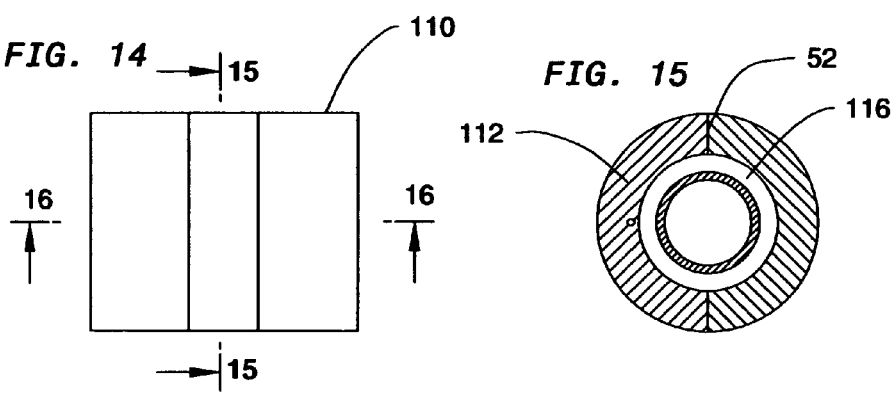
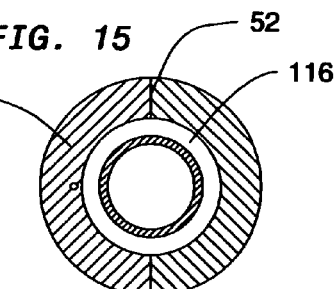
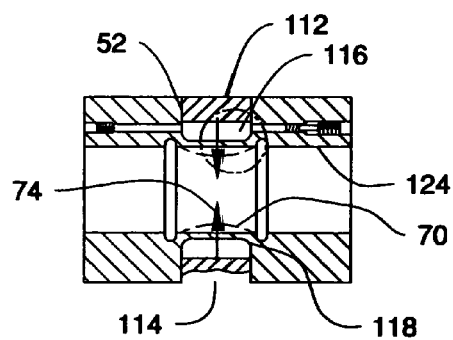
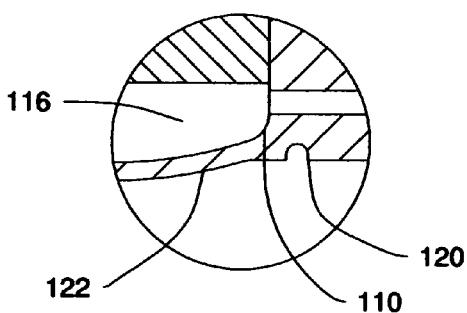

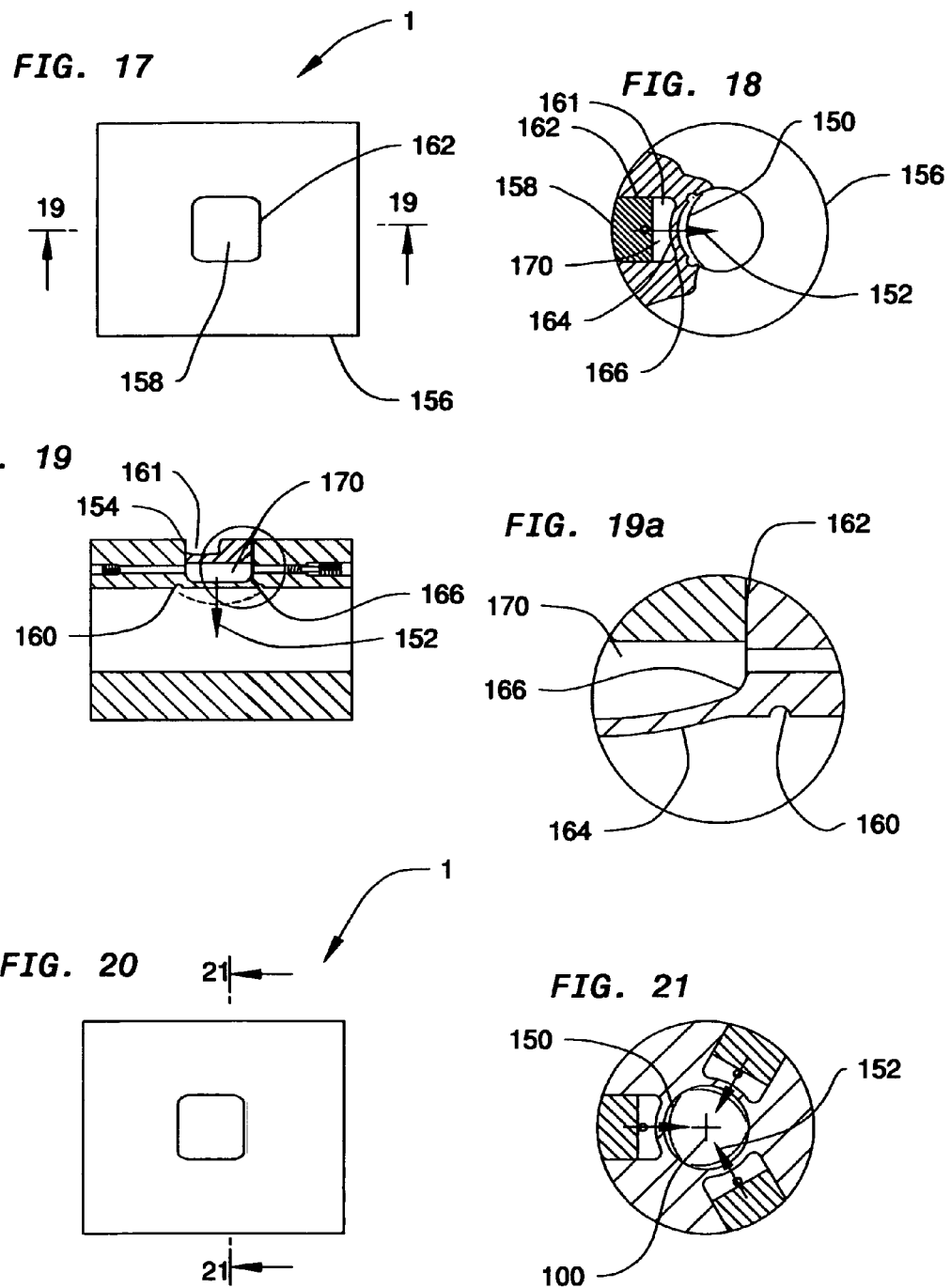

FIG. 22
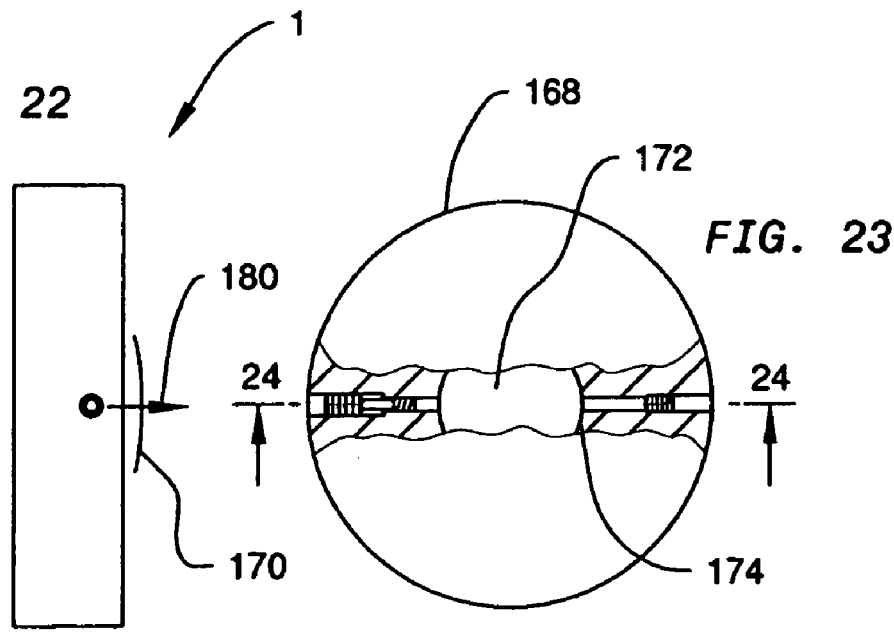
FIG. 23
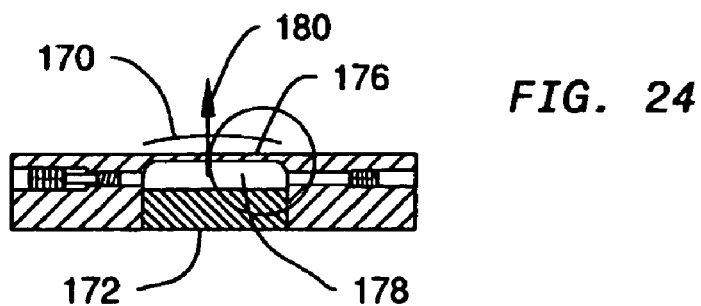
FIG. 24
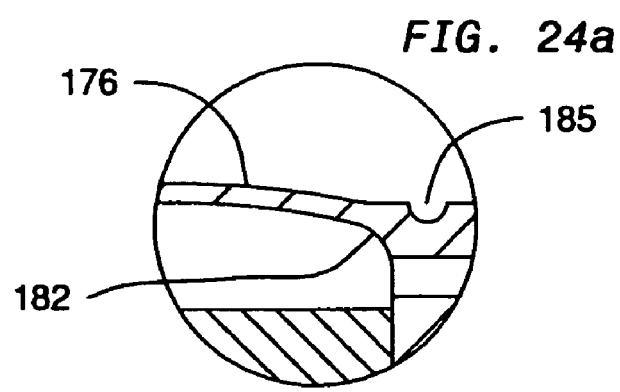
FIG. 24a

EXPANSION MOTOR

BACKGROUND OF THE INVENTION

In manufacturing, engineering and scientific work often it is needed to clamp, or manipulate parts, or control a gap space between them. Arrays of devices are used to manipulate parts so new features can be created with proper relationship to existing features when machining parts. In power transmission trains shafts are coupled and pulleys are clamped in place. Optical alignment sometimes requires alignment in angstroms to split light beams. Before mentioned are some of tasks that deal with clearances or clamping ranges few thousands of an inch or millimeters. This work requires this excursion of a movable feature of these devices to be controlled within this barely visible range. In some instances as with a brake or clutch the movement is practically non measurable as a preload is being applied. That is, pressure on contacting surfaces is increased or decreased as with a brakes and clutches. Another example of micro inch movement is with the displacement of the mounting of variable stiffness hydraulic dampeners.

These type clamping is disclosed in an early example using an expandable sleeve is in U.S. Pat. No. 4,366,735 and later U.S. Pat. No. 6,077,003 each using seals of various materials. Other chucks and holding devices are shown by U.S. Pat. No. 5,127,780 and U.S. Pat. No. 6,488,285 B1. A shortcoming of the gripping sleeves is that the preload on the compressible seals is reduced as the pressure expands or reduces the removable wall. Therefore, the increasing the hydraulic pressure reduces the sealing. Melted copper seals delaminate and fail under torsion loads. Also, highly stressed fusible alloy welds also fail with the internal pressures of cooling metals. An example of a device for positioning is U.S. Pat. No. 5,362,185 showing is a widening elastic rod. A fluid under elastic membrane is shown in U.S. Pat. No. 6,375,172.

SUMMARY AND OBJECTS OF THE INVENTION

The present invention overcomes the disadvantages of the prior art expandable holders by having a deformable wall that is filleted with the inside walls to improve the range of motion and also to eliminate stress concentration thereby extending the life cycle expectancy. It is a further object of the invention to hold a workpiece stiffly. Yet another objective of the invention is a means to manipulate and hold the workpiece so the axis is independent of the holder axis. Still further the invention is an actuator to move a workpiece in very small movements whereby stiction is hardly a consideration.

It is a further objective of the invention that a pressure chamber having a thin wall with rounded inside corners around the perimeters to eliminate stressed concentrations known as stress risers. The patent also provides for a device that is heat treatable after fusion or welding to normalize and relieve internal stresses.

BRIEF DESCRIPTION OF THE DRAWINGS

The object and the advantages of the invention will become apparent from the following detailed description of preferred embodiments thereof in connection with the accompanying drawings in which like designate like elements in which:

FIG. 1 is a side view of a motor body according to the present invention;
FIG. 2 is an orthographic end view described in FIG. 1;
FIG. 3 is a section view taken along line 3—3 of the motor body described in FIG. 1;
FIG. 3a is an enlargement of a section of FIG. 3 showing construction and operation according to the present invention;
FIG. 3b is also an enlargement of a section FIG. 3 showing another construction and operation body according to the present invention;
FIG. 3c is also an enlargement of FIG. 3 showing another construction and function according to the present invention;
FIG. 4 is a end view of a expansion sleeve;
FIG. 5 is a side view of FIG. 4;
FIG. 5a is an enlarged view described in FIG. 5; showing breakout;
FIG. 6 is a side view of yet another configuration of the motor body according to the present invention;
FIG. 7 is a orthographic projection of the side view FIG. 6;
FIG. 7a is an enlarged view of a break out of FIG. 7;
FIG. 8 is a section view taken along line 8—8 of a motor body described in FIG. 6;
FIG. 8b is an enlargement of section view FIG. 8 showing operation and another construction;
FIG. 8a is another enlargement of section view FIG. 8 showing operation and another construction;
FIG. 9 is a plan view of the cover;
FIG. 10 is an orthographic projection of the side view of FIG. 9;
FIG. 11 is a side view taken along 11—11 of FIG. 9; FIG. 1 is a side view of a motor body according to the present invention;
FIG. 12 is a side view of the motor according to the invention;
FIG. 13 is a orthographic end view of FIG. 12;
FIG. 14 is yet another configuration of the motor according to the present invention;
FIG. 15 is a section view taken 15—15 in FIG. 14;
FIG. 16 is a section view taken 16—16 in FIG. 14;
FIG. 16a is an enlarged view of view of FIG. 16;
FIG. 17 is a side view of another configuration of the motor according to the present invention;
FIG. 18 is an orthographic projection of the side view described in FIG. 17;
FIG. 19 is a section view taken along 19—19 of FIG. 17;
FIG. 19a is a enlarged view described in FIG. 19;
FIG. 20 is another configuration of the motor according to the present invention;
FIG. 21 is a section view taken along 21—21 of the side view described in FIG. 20;
FIG. 22 is a side view of a yet another motor body configuration according to the present invention;
FIG. 23 is an orthographic projection of the view described in FIG. 22;
FIG. 24 is a section view taken along line 24—24 described in FIG. 23;
FIG. 24a is an enlarged view described in FIG. 24;

DETAILED DESCRIPTION OF PREFERRED EMBODIMENTS OF THE INVENTION

Depicted in FIGS. 1–3 is a motor 1 when expansion sleeve 13 is my means expanded as shown by dashed line 4 in the direction indicated by arrow 6 according to the invention. In FIG. 1 motor 1 comprising is comprised of a main body 11 and an expansion sleeve 13. The main body 11 has a left face 12 and right face 14. The faces 12 and 14 are defined by a shape 16. In FIG. 2 main body 11 has an annular cavity 24 with a thick bottom 20. In FIG. 3 annular thick bottom 20 is bounded laterally by annular thick walls 26. The upper portion of thick wall 26 has a flexure 30 ending with an opening wall 32 generally perpendicular to the thick bottom 20 thereby providing annular opening 28. Flexure 30 has an interior surface 34 being parallel to thick bottom 20. The corner of surface 34 and thick wall 26 is rounded 34 to eliminate stress concentration. Service channel 38 connecting cavity 24 with and open to outside is removably blocked with check screw 40. Pressure channel 42 also open to the outside is threaded to accept plunger 44 and is bored 46 to provide surface for seal 48. FIG. 3a shows the expansion sleeve 13 having been joined with a fusible alloy 52. Plunger 44 is screwed in direction indicated my movement arrow 50 this compressing fluid in confined cavity 24 causing expansion sleeve 13 to bilge 54. Stress concentration is further relieved by groove 56. FIG. 3b demonstrates expansion sleeve 13 with flange 60 having rounded corner 62 joined with fusible alloy 52 to thick wall 26. In FIG. 3c annular cavity 24 is cast 66 in motor 1. FIG. 4–5 where FIG. 4 is end view of expansion sleeve 13 and FIG. 5 is a side view with a break out while FIG. 5a is a view to demonstrate another configuration of sleeve 13 having flange 60 and rounded corner 62.

In FIG. 6–8, FIG. 6 another configuration the motor 1 is in accordance to the present invention whereby expansion 70 is in direction shown by vector arrow 74. Motor 1 has a main body 88 and an insert 90 with a stress relief groove 98 spaced from around the perimeter. In FIG. 7 it is shown insert 90 is joined fused 89 around the perimeter to flexure 82 along longitudinal wall 92 and radial wall 78. Cavity 76 has a thick wall 84 and thick walls 94 having rounded corner 86 to relieve stress when compressed fluid causing insert 90 and flexure end 82 to bulge 70 in direction of vector arrow 70. Stress is further relieved by groove 98 spaced around the perimeter of insert 90. FIG. 7a is an example of insert 96 having a flange 92 around the inside wall 94 perimeter and a fillet 72. FIG. 7b shows the motor 1 as a molded part 99. In FIG. 8 the width of arch cavity 76 is bound with radial by thick walls 78 and the length is by longitudinal thick walls 94. Thereby arch cavity 76 has a bottom 80 and is surrounded by walls 76 and 94 having a flexure protrusion 82 ending with opening wall 92 along the top edge and has an inside surface 84 that is with a rounded corner 86 to thick wall 94. FIG. 8 shows flexure protrusion 82 ending with opening wall 92 and a rounded corner 86 to radial wall 78 and thick bottom 80. FIG. 8a the enlarged view from FIG. 8 showing another construction or the motor with insert 96 having flange 72 fusible joined 89 and cavity 76. Insert 90 is shown in FIG. 9–11 with a plan view shown in FIG. 9 and an orthographic view in FIG. 10 showing a longitudinal and FIG. 11 showing a radial section.

Yet another configuration of the motor 1 according to the invention is demonstrated in FIG. 12–15 is having motor 1 configuration arrayed plural radial around the body 102. The force vectors 74 radiate approximately perpendicular to the center axis 100.

Another configuration of the motor 1 according to the invention is demonstrated in FIG. 14–16 is having a motor body 110 and thick arch sections 112. In FIG. 16 it is seen that main body has annular groove 114 with rounded corner 118 to relieve stress concentration with a remaining thin wall 122. Groove 114 partially filled with arch sections 112 and all joint fused 52 resulting in cavity 116. To further relieve stress annular inside groove 120 is grooved in inside wall 124. When cavity 116 is pressurized thin wall is expanded 118 in direction of vector arrow. FIG. 16a further demonstrates this with the enlarged view In FIG. 17–19 another configuration of the motor 1 is shown in FIG. 17 with congruent plug 168 joined fused 162 to body 156. In FIG. 18 thin wall 164 is deflected to bulge 150 in the direction shown by vector arrow 152. Motor 1 has a main body 156 and an opening 161 extending to a thin wall 164 with a stress relief groove 160 spaced from around the outer perimeter of thin wall 152. It is shown that congruent plug 158 extends into opening 161 providing cavity 170. Thin wall 152 is bounded with round corners 166 to further eliminate stresses. FIG. 19a is an enlarged view showing thin wall 164 bulged with stress taken by rounded corner 166 and groove 160. in whereby expansion is area 150 in direction shown by vector arrow 152. Motor 1 has a main body 156 and a cavity 158 extending to a thin wall 152 with a stress relief groove 160 spaced from around the perimeter of local area 152. In FIG. 18 it is shown that cavity 158 to a depth to provide for a thin wall 152 with fillet corners 166 further eliminate stresses. A congruent plug 158 which provides space for cavity 170 is joined with a fusible alloy 89.

Yet another configuration of the motor 1 according to the invention is demonstrated in FIG. 20–21 is having motor 1 configuration arrayed plural radial around the body. The force vectors 152 converge approximately perpendicular to the center axis 100.

Another configuration of motor 1 shown in FIG. 22–24 according to the invention is taught in FIG. 22 whereby expansion 170 is achieved in direction of vector arrow 180. FIG. 23 shows body 168 with congruent plug 172 fused to body 168. In FIG. 24 opening 174 extends to thin wall 176 with congruent plug 172 providing for cavity 178. When cavity 178 has pressure thin wall 176 has bulge 170 in direction of vector arrow 180. FIG. 24a shows thin wall 176 bulge with stress taken with round corner 182 and groove 185 spaced around thin wall 176.

The present invention may, of course, be carried out in other specific ways other than those herein set forth without departing from the spirit and essential characteristics of the invention. The present embodiments are, therefore, to be considered in all respects as illustrative and not restrictive and all changes coming within the meaning and equivalency range of the append claims are intended to embraced therein.

What is claimed is:

1. An external expandable holding device comprising;
   a) first member having a external surface with an annular groove having protruding lips;
   b) a resilient expansion sleeve is fusibly connected to the protruding lips along the edge of the annular groove; flexurally to the first member for receiving the aperture of a second member;
   c) a fillet along the lip and fillister along the expansion area to further relieve stress;
   d) an expansion chamber with an external leading channel is defined between the first member and the expansion sleeve for receiving fluid;
   e) wherein fluid is by means pumped to pressurize expansion chamber thereby the expansion sleeve is deformed to engage the second member;
   f) whereby upon release of the pressure the expansion sleeve returns to the relaxed condition to release the second member.

2. The expandable device according to claim 1 wherein the holder and the expansion sleeve are cylindrical and the expansion sleeve expands radially outwardly to engage the second member.

3. The expandable device according to claim 2 whereby the fluid is a liquid.

4. The expandable device according to claim 2 whereby the holding device comprises of a plurality of independent expansion chambers that are axial arrayed radially.

5. The expandable device according to claim 4 whereby the holding device comprises of a plurality of independent expansion chambers arrayed longitudinally.

6. The expandable device according to claim 2 whereby the holder is a shaft, a mandrel, an arbor, a clutch, a friction brake, a coupling, a damper, or a workholder and the second part is a tool, a workpiece, a hub, or a part.

7. The expandable device according to claim 2 whereby the holder is a molded piece.

8. The expandable device according to claim 2 wherein the expansion chamber is an annular expansion chamber extending around the circumference of the holder.

9. The expandable device according to claim 8 whereby the holding device comprises of a plurality of expansion chambers arrayed longitudinally.

10. The expandable device according to claim 2 wherein the expansion chamber extends around a portion of the circumference of the holder.

11. The expandable device according to claim 5 whereby the holding device comprises of a plurality of expansion chambers arrayed longitudinally.

12. An internal expandable holding device comprising;
   a) a first member having a bore for receiving a second member;
   b) a cover to the secured to the first member;
   c) an expansion chamber with rounded corners to eliminate stress concentration extends to a thin wall as defined by the bore is defined within the first member between the cover;
   d) the expansion chamber is joined by a channel to an aperture;
   e) furthermore to reduce stress concentrations the bore surface has fillisters along the thin wall;
   f) wherein fluid is by means pumped to pressurize expansion chamber thereby the first member is deformed to exert force to the second member;
   g) whereby upon release of the pressure the first member returns to the relaxed condition to remove the force from the second member.

13. The expandable device according to claim 12 wherein the holder and the expansion sleeve are cylindrical and the expansion sleeve expands radially inward to engage the second member.

14. The expandable device according to claim 13 wherein the expansion chamber is an annular expansion chamber extending around the holder.

15. The expandable device according to claim 13 whereby the fluid is a liquid.

16. The expandable device according to claim 13 whereby the fluid is a gas.

17. The expandable device according to claim 14 whereby the holding device comprises of a plurality of expansion chambers arrayed longitudinally.

18. The expandable device according to claim 13 whereby the holder is a collet, a hub, a journal, a coupling, a clutch, a friction brake, or a workholder and the second part is a tool, a workpiece, a shaft, or a part.

19. The expandable device according to claim 13 whereby the holder is a molded piece.

20. The expandable device according to claim 14 wherein the expansion chamber extends around a portion of the bore of the holder.

21. The expandable device according to claim 20 whereby the holding device comprises of a plurality of expansion chambers arrayed polar radially.

* * * * *